(12) United States Patent
     Muller

(10) Patent No.: US 10,214,699 B2
(45) Date of Patent: Feb. 26, 2019

(54) SCALE COLLECTION AND PREDISTRIBUTION TRAY FOR VESSEL WITH DOWNWARD TWO-PHASE FLOW

(71) Applicant: MORTEN MULLER LTD. APS, Fredensborg (DK)

(72) Inventor: Morten Muller, Fredensborg (DK)

(73) Assignee: MORTEN MULLER LTD. APS, Fredensborg (DK)

( * ) Notice: Subject to any disclaimer, the term of this patent is extended or adjusted under 35 U.S.C. 154(b) by 104 days.

(21) Appl. No.: 15/125,005

(22) PCT Filed: Mar. 13, 2015

(86) PCT No.: PCT/EP2015/055261
§ 371 (c)(1),
(2) Date: Sep. 9, 2016

(87) PCT Pub. No.: WO2015/136066
PCT Pub. Date: Sep. 17, 2015

(65) Prior Publication Data
US 2017/0015917 A1    Jan. 19, 2017

Related U.S. Application Data

(60) Provisional application No. 61/953,067, filed on Mar. 14, 2014.

(30) Foreign Application Priority Data
Mar. 14, 2014   (EP) ..................................... 14159895

(51) Int. Cl.
*C10G 75/00*   (2006.01)
*B01J 8/04*    (2006.01)
(Continued)

(52) U.S. Cl.
CPC ......... *C10G 75/00* (2013.01); *B01D 19/0068* (2013.01); *B01D 21/0039* (2013.01);
(Continued)

(58) Field of Classification Search
CPC ...... C10G 75/00; C10G 67/02; C10G 49/002; B01J 8/007; B01J 2208/00938;
(Continued)

(56) References Cited

U.S. PATENT DOCUMENTS 3,112,256 A * 11/1963 Young .................... B01D 3/008
                                                      208/146
3,824,081 A *  7/1974 Smith et al. ........... B01J 8/0492
                                                      422/217
(Continued)

FOREIGN PATENT DOCUMENTS

| EP | 0716881 | | 6/1996 |
| EP | 0 890 551 | * | 1/1999 |
| WO | WO02/070120 | | 9/2002 |

OTHER PUBLICATIONS

EPO translation of Morgenroth et al. EP 0 890 551 A2 published Jan. 13, 1999 (Year: 1999).*

(Continued)

*Primary Examiner* — Stephen Hobson
(74) *Attorney, Agent, or Firm* — Klein, O'Neill & Singh, LLP

(57) ABSTRACT

Vapor and liquid flow concurrently down through a vertical vessel. A horizontal scale collection and predistribution tray is located in the vessel to remove solid contaminants and to redistribute the liquid to a fine distribution tray. The scale collection and predistribution tray consists of a tray plate with a scale collection zone where the solid contaminants settle and deposit. In one embodiment, an upstanding permeable wall forms the scale collection zone, and liquid is (Continued)

filtered as it flows through the permeable wall, leaving the solid contaminants trapped upstream from the permeable wall. The predistribution tray has a rim provided with a slotted weir. Liquid from the scale collection zone forms a liquid level in a trough located between the permeable wall and the weir. Due to the uniform liquid level in the trough, liquid flow rates through the slots in the weir are nearly equal. Because of the polygonal shape of the tray, the liquid exits the slots in a direction along lanes defined between distribution units on the fine distribution tray, and the amount of liquid entering the vapor inlets of the distribution units is therefore small. Vapor by-passes the scale collection and predistribution tray through the area between the reactor wall and the permeable wall, and through the area between the reactor wall and the weir to the fine distribution tray. The scale collection and predistribution tray protects the fine distribution tray and the catalyst bed from fouling, predistributes liquid to the fine distribution tray to minimize level gradients on this tray, and reduces flow velocities to ensure calm flow conditions on the fine distribution tray.

32 Claims, 11 Drawing Sheets

(51) Int. Cl.
| | | |
|---|---|---|
| *B01J 8/00* | (2006.01) | |
| *B01J 8/02* | (2006.01) | |
| *C10G 49/00* | (2006.01) | |
| *C10G 67/02* | (2006.01) | |
| *B01D 19/00* | (2006.01) | |
| *B01D 21/00* | (2006.01) | |

(52) U.S. Cl.
CPC .............. *B01J 8/007* (2013.01); *B01J 8/0085* (2013.01); *B01J 8/025* (2013.01); *B01J 8/0278* (2013.01); *B01J 8/0453* (2013.01); *B01J 8/0492* (2013.01); *C10G 49/002* (2013.01); *C10G 67/02* (2013.01); *B01J 2208/00938* (2013.01)

(58) Field of Classification Search
CPC ........ B01J 8/025; B01J 8/0085; B01J 8/0278; B01J 8/0492; B01J 8/0453; B01D 3/008; B01D 21/0039; B01D 19/0068
See application file for complete search history.

(56) References Cited

U.S. PATENT DOCUMENTS

| | | | | |
|---|---|---|---|---|
| 3,958,952 A * | 5/1976 | van Ginneken | ....... | B01D 46/30 422/616 |
| 4,239,614 A * | 12/1980 | Hutchings | ................ | B01J 8/025 208/108 |
| 4,380,529 A * | 4/1983 | Gupta | .................... | B01J 8/0278 422/217 |
| 4,615,796 A * | 10/1986 | Kramer | .................. | B01J 8/0085 208/146 |
| 4,808,350 A * | 2/1989 | Robbins | .................... | B01D 3/20 261/96 |
| 4,937,051 A * | 6/1990 | Graven | .................. | B01J 8/0453 261/149 |
| 5,061,407 A * | 10/1991 | Nutter | .................. | B01D 53/185 261/96 |
| 5,192,465 A * | 3/1993 | Petrich | .................. | B01D 3/008 261/97 |
| 5,484,578 A * | 1/1996 | Muldowney | ........... | B01D 3/008 261/113 |
| 5,635,145 A * | 6/1997 | Den Hartog | ........... | B01J 8/0492 261/97 |
| 5,772,970 A * | 6/1998 | Okamoto | ............... | B01J 8/0492 261/114.1 |
| 6,695,008 B2 * | 2/2004 | Fehr | ......................... | B01D 1/00 137/315.01 |
| 7,078,002 B2 * | 7/2006 | Van Vliet | ............ | B01F 3/04496 366/341 |
| 7,276,215 B2 * | 10/2007 | Muller | ..................... | B01D 3/18 261/110 |
| 7,500,658 B2 * | 3/2009 | Boyer | .................. | B01D 53/185 261/96 |
| 7,506,861 B2 * | 3/2009 | Muller | ..................... | B01D 3/20 261/114.1 |
| 8,329,974 B2 * | 12/2012 | Koudil | ................... | B01J 8/0085 208/108 |
| 8,487,151 B2 * | 7/2013 | Koudil | ................... | B01J 8/0278 210/251 |
| 9,403,139 B2 * | 8/2016 | Muller | ..................... | B01J 10/00 |
| 9,861,947 B2 * | 1/2018 | Palmer | .................. | B01J 8/0278 |
| 2002/0068027 A1 * | 6/2002 | Gupta | ..................... | B01J 8/008 422/217 |
| 2004/0141892 A1 * | 7/2004 | Van Hasselt | .......... | B01D 3/008 422/600 |
| 2009/0324464 A1 * | 12/2009 | Sechrist | ................ | B01J 8/0453 422/600 |
| 2010/0185032 A1 * | 7/2010 | Iselborn | ................... | B01J 8/008 585/250 |
| 2011/0201856 A1 * | 8/2011 | Cottard | .................... | B01J 8/006 585/250 |
| 2012/0168389 A1 * | 7/2012 | Kochergin | ......... | B01D 21/0087 210/800 |
| 2013/0064727 A1 | 3/2013 | Koudil et al. | | |
| 2013/0221123 A1 * | 8/2013 | Oshinowo | ............ | B01J 19/0053 239/1 |
| 2016/0061541 A1 * | 3/2016 | Chen | ....................... | F28F 25/08 203/89 |
| 2017/0113199 A1 * | 4/2017 | Palmer | .................. | B01J 8/0278 |
| 2017/0144121 A1 * | 5/2017 | Buttridge | ............... | B01J 8/0492 |

OTHER PUBLICATIONS

International Search Report on corresponding PCT application (PCT/EP2015/055261) from International Searching Authority (EPO) dated May 26, 2015.

Written Opinion on corresponding PCT application (PCT/EP2015/055261) from International Searching Authority (EPO) dated May 26, 2015.

* cited by examiner

FIG. 2A (VIEW A-A)

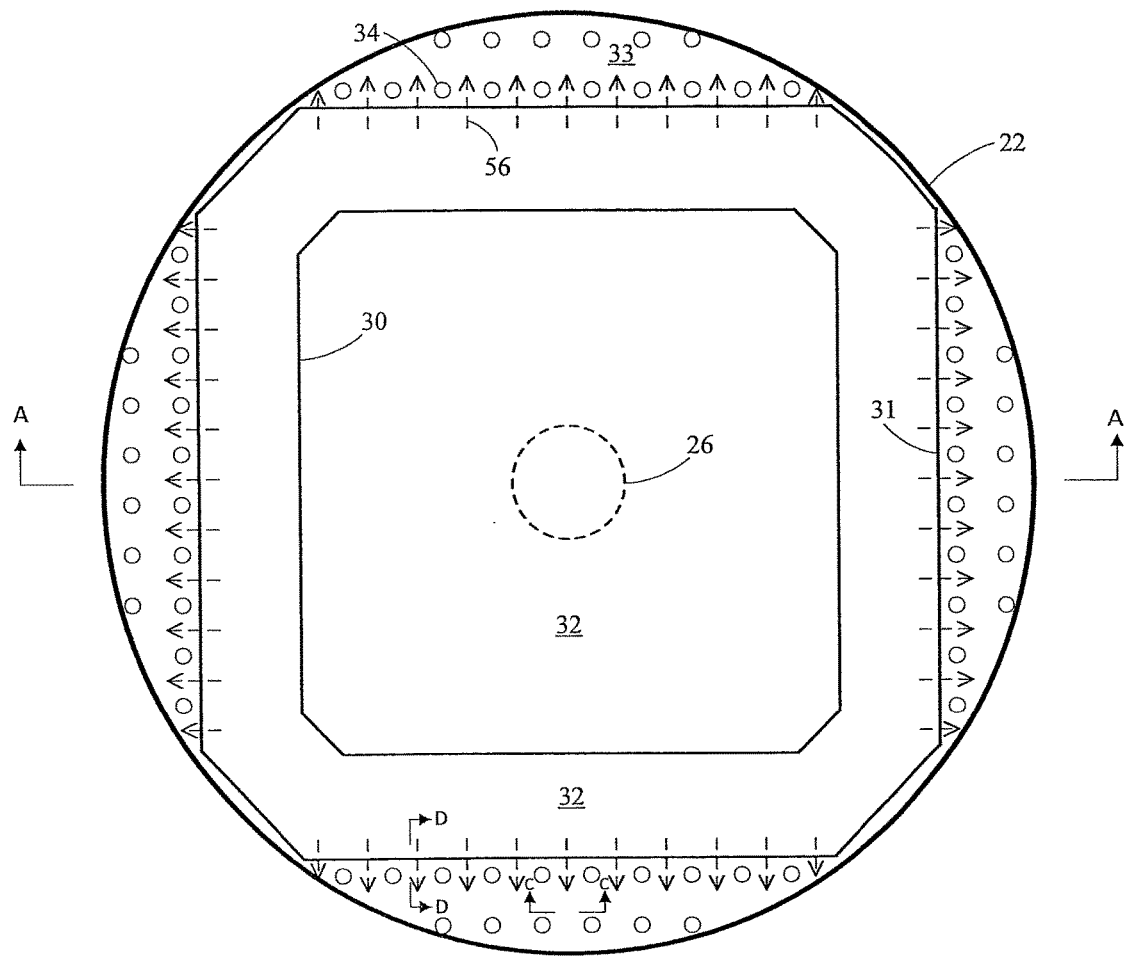
FIG. 2B (VIEW B-B)

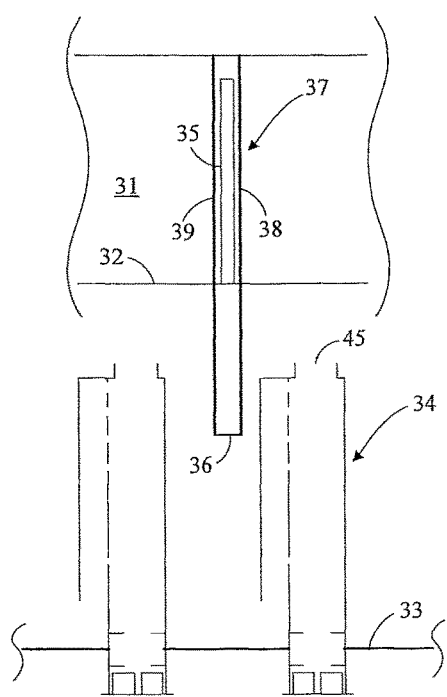 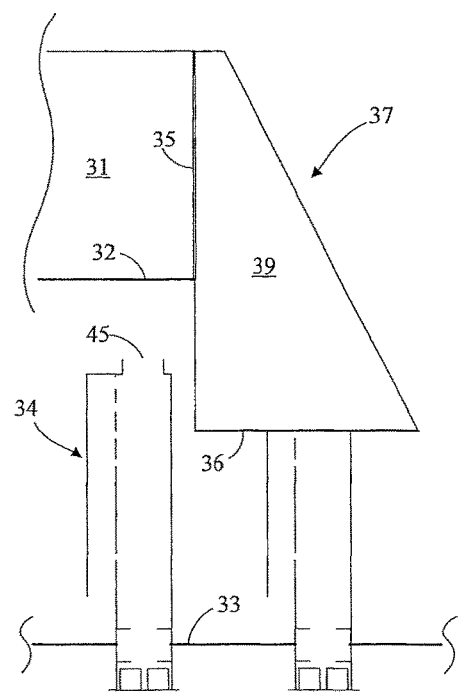
FIG. 2C (VIEW C-C)	FIG. 2D (VIEW D-D)

FIG. 5A                     FIG. 5B

SCALE COLLECTION AND PREDISTRIBUTION TRAY FOR VESSEL WITH DOWNWARD TWO-PHASE FLOW

CROSS-REFERENCE TO RELATED APPLICATIONS

This application is the national phase entry, under 35 U.S.C. Section 371(c), of International Application No. PCT/EP2015/055261, filed Mar. 13, 2015, claiming priority from European Application No. 14159895.3, filed Mar. 14, 2014. This application further claims the benefit, under 35 U.S.C. § 119(e), of U.S. Provisional Application No. 61/953,067, filed Mar. 14, 2014. The disclosures of the International Application, the European Application, and the US Provisional Application from which this application claims priority are incorporated herein by reference in their entireties.

FEDERALLY SPONSORED RESEARCH OR DEVELOPMENT

Not Applicable

BACKGROUND OF THE INVENTION

Field of the Invention

The present invention relates to a predistribution tray with scale collection functionality. The predistribution tray is typically located above a fine distribution tray in a vessel where a vapor phase and a liquid phase are flowing concurrently downward. The main purpose of the tray is to provide predistribution of liquid to the fine distribution tray, to remove larger scales and other larger solid impurities from the process stream, and to reduce any high velocities of the process stream before the stream reaches the fine distribution tray. The predistribution tray is suited for, but not limited to, the application of predistribution of hot hydrogen-rich treatgas and hot hydrocarbon liquid at the inlet of trickle bed reactors or hydroprocessing reactors, such as hydrotreating or hydrocracking reactors.

Description of Related Art

Several approaches and devices have been proposed for scale collection or filtering and for predistribution of liquid to a fine liquid distribution tray in two-phase concurrent downflow vessels, such as trickle bed catalytic reactors, in order to avoid solid contaminants in the feed stream collecting in the catalyst bed or on the fine distribution tray, causing excessive pressure drop and/or reduced apparent catalyst activity, and in order to protect the fine distribution tray from high velocity streams. The majority of these approaches or devices belong to one of the five groups mentioned below:

Group 1: Fluid by-Pass of Fouled Bed

An example of this approach is given in U.S. Pat. No. 4,380,529. An upper catalyst bed 22 is provided with by-pass tubes 23 and 24. When the upper catalyst bed is clean and the pressure drop across this bed therefore is low, only small amounts of vapor and liquid is claimed to bypass through the tubes 23 and 24. When the upper catalyst bed gradually becomes fouled and the pressure drop across the bed is increased, then larger amounts of vapor and liquid will by-pass the bed. As a result, the overall reactor pressure drop is reduced, and the process unit can stay in operation for a longer period, before the reactor pressure drop exceeds the available pressure from pumps and compressors in the process unit. The approach of fluid by-pass of the fouled bed has the disadvantage that the active catalyst is by-passed, so that the conversion of reactants to products is reduced. Also, in hydroprocessing reactors, if hydrogen is by-passed around a catalyst bed, then the rate of coke formation in that catalyst bed is increased. Coke formation results in high rates of catalyst deactivation and increased bed pressure drop.

Another example of fluid by-pass of a fouled catalyst bed is given in U.S. Pat. No. 6,692,705, where fluid is bypassed through a bypass tube 1 into a cage 2 with perforations 9 into a lower portion of the catalyst bed 5.

Group 2: Baskets Immersed in the Catalyst Bed

This was one of the first approaches used in hydroprocessing reactors to prevent plugging of the catalyst bed inlet with larger scales and solid contaminants. An example of baskets immersed in the catalyst bed is given in U.S. Pat. No. 3,112,256. Baskets 30 are immersed down into the inert topping layer, such as ceramic balls 32, and down into the active main catalyst bed 34. The upper edges of the baskets 30 are normally flush with the top of the inert topping layer 32. The baskets 30 increase the flow area available for fluid flow into the bed and thus lower the pressure drop for fluid entry into the bed. Therefore, as the inlet to the bed becomes fouled, the increase in bed pressure drop is lower for a bed with baskets 30 than for a bed without baskets 30.

The significant drawback of using baskets at the bed inlet is that the baskets 30 significantly deteriorate the fluid distribution provided by the fine distribution tray 18. In addition, reactants are bypassed, through the baskets, across the upper layer of catalyst. As a result the apparent catalyst activity is reduced when baskets at the inlet of the catalyst bed are used to reduce the bed pressure drop.

Group 3: Graded Guard Beds

Today, probably the most widely used industrial method to protect a fixed catalyst bed from solid impurities is by using graded guard beds of inert or catalyst particles at the reactor inlet. Typically, particle size, shape, and catalytic activity are graded, so that the particle size and the void fraction are gradually reduced, and the catalytic activity of the particles is gradually increased in the downward fluid flow direction in the reactor.

An example of a graded guard bed is given in U.S. Pat. No. 4,615,796. The reactor 1 has graded layers of particles 2, 3, 4, 5, and 6 in order to protect the main catalyst bed from solid contaminants. The upper layers are large particles with wide flow channels for fluid flow between the particles, and the lower layers are small particles with narrow flow channels for fluid flow between the particles. By having these graded layers, the solid contaminants will travel further down into the bed before they are trapped by the narrow flow channels. Also, the upper layers typically have high void fractions. For these two reasons the total volume available for deposit of solid contaminants in the space between the particles is increased, and consequently the rate of reactor pressure drop increase is lower when graded guard beds are used.

The disadvantage of using graded guard beds for accumulation of the solid contaminants in the feed is that the guard beds take up a significantly height of the straight part of the reactor 1. The graded layers of particles used to protect the main catalyst bed have low or no catalytic activity, and consequently the conversion of reactants to products in the reactor 1 is reduced.

The approaches and devices of group 1, 2, and 3 are located downstream from the fine distribution tray and thus do not provide predistribution of liquid to the fine distribution tray, nor do they provide protection of the fine distribution tray against fouling or high velocity streams.

Group 4: Filtering Trays Without Vapor By-Pass

An example of a filtering tray without vapor by-pass is given in U.S. Pat. No. 3,958,952. The entire process stream is forced to flow through filter units 4. The filtering tray without vapor by-pass removes the solid contaminants and therefore protects the fixed catalyst bed from fouling, so that the increase in pressure drop across the catalyst bed is reduced. Instead, the increase in pressure drop occurs across the filtering tray itself, resulting in increased reactor pressure drop and, at some point in time, shut down of the reactor is required for filter unit replacement or cleaning. See line 9-15 column 4. Shutdown of the reactor, and personnel entry into the reactor of a hydroprocessing unit is normally only done during catalyst replacement, since this operation is time-consuming and expensive. Another disadvantage of the design is that the filtering tray does not provide proper predistribution of the liquid to the fine distribution tray 3. Therefore, liquid level gradients may develop on the fine liquid distribution tray 3 as liquid is flowing from one area of this tray to another. These liquid level gradients will reduce the distribution performance of the fine distribution tray.

Another example of a filtering tray without vapor by-pass is given in U.S. Pat. No. 4,239,614. This filtering tray has annular beds of particles 4, 6, and 7. The entire process stream is forced to flow through these beds of particles, and solid contaminants will accumulate upstream from and in the particle beds. The tray has the same disadvantages as mentioned for U.S. Pat. No. 3,958,952.

Group 5: Filtering Trays with Vapor By-Pass

The benefit of all the filtering trays with vapor by-pass is that the process stream can flow through the tray even when the filter is plugged or full. The pressure drop across the tray is low even when the filters are full.

A first example of a filtering tray with vapor by-pass is given in U.S. Pat. No. 3,824,081. The filtering tray 5 is provided with a vapor opening at the tray center. A weir 7 surrounds this vapor opening and thus forms a vapor chimney. The tray 5 is provided with wire mesh baskets 6. During operation, the vapor flows through the vapor chimney, the liquid collects on tray 5, behind weir 7, and flows into the baskets 6, and through wire mesh or screen 47. Scales and solid contaminants are thus collected in the baskets 6. The drawback of the specific design is that the filtering tray provides poor predistribution of liquid to the fine distribution tray 40. Therefore, liquid level gradients may develop on the fine liquid distribution tray 40, as liquid is flowing from one area of the tray to another. These liquid level gradients will reduce the distribution performance of the fine distribution tray 40. Another disadvantage is that the height of the filtering tray has to be large in order to provide the required basket volume for collection of the scales and particles. To accommodate the filtering tray, the height of the reactor will have to be increased, which is associated with large additional costs.

A second example of a filtering tray with vapor by-pass is given in U.S. Pat. No. 8,487,151. The filtering tray consists of a perforated tray 1 with a filtration bed comprising different layers of particles I, II, III, and IV (FIG. 1). Vapor chimneys 3 are routed through the particle layers and the perforated tray 1. During operation, the vapor passes through the chimneys 3, while the liquid is trickling down through the filtration bed and through the perforations 7 in the tray 1. Larger solid impurities will accumulate in the void space between the particles of the filtration bed. At some point in time, the liquid may no longer be able to pass through the filtration bed, and the liquid will overflow the central tube 4 to the fine distribution tray 10. Again the drawback of this design is that the filtering tray provides poor predistribution of liquid to the fine distribution tray 40. This is especially true when the filtering bed in some areas gets plugged by solid impurities, and the liquid flow through these areas stops. When the filtering tray is full and the liquid therefore passes through overflow pipe 4, all the liquid feed may enter the fine distribution tray 10 near the centerline of the reactor. This situation is known to result in large liquid level gradients on the fine liquid distribution tray 10, because the radial outward liquid mass flux near the reactor centerline gets very large. The liquid level gradients will reduce the distribution performance of the fine distribution tray 10. Another disadvantage is that the height of the filtering tray has to be large, in order to provide the required volume of the void space between the filtering particles for deposit of the scales and solid contaminants. The height of the reactor will have to be increased to accommodate the filtering tray, which is associated with large additional costs.

A third example of a filtering tray with vapor bypass is given in U.S. Pat. No. 8,329,974 and US patent application US 2013/0064727 A1. The filtering tray consists of a tray with perforations 12. A granular filtration bed comprising three different layers rests on the perforated tray. The tray is provided with chimneys 3 having vapor openings 6, and liquid slots 4, and is surrounded by cylindrical screens 8. During operation, the vapor by-passes the filtration bed through the vapor openings 6 and the chimneys 3 to the active catalyst bed 10. In the start of the cycle, when the filtration bed is clean, the liquid is passing through the filtration bed and through the perforations 12 to the active catalyst bed 10. As the filtration bed gets plugged, the liquid flow stops in the plugged areas, and liquid will instead pass through the liquid slots 4 and chimneys 3 to the active catalyst bed 10. The drawback of this filtering tray is that as some areas of the filtering bed become plugged, the liquid flow through these areas stops, and the active catalyst located below the plugged areas of the filtering tray receives no liquid feed.

Chimney trays are widely used to distribute liquid evenly to catalyst beds, but uniform liquid distribution from a chimney tray requires that all chimneys are exposed to approximately the same liquid level. With the filtering tray as disclosed in the above example, all chimneys will not be exposed to the same liquid level, because of the flow resistance of the filtering bed, and because some areas of the filtering bed will become more fouled than other areas and thus further increase the flow resistance of the bed. Due to the large flow resistance of the filtering bed, chimneys 3 located in an area receiving large liquid amounts from above will pass large quantities of liquid to bed 10, and chimneys 3 located in an area receiving small liquid amounts from above will pass small quantities of liquid to bed 10. The consequences of the non-uniform liquid feed distribution to the active catalyst bed 10 are lower overall conversion of reactants to products, and radial temperature differences in the active catalyst bed 10. Another disadvantage of the filtering tray is that the tray will have to be located in the straight portion of the reactor as, shown in FIG. 1 of U.S. Pat. No. 8,329,974, and that the height of the filtering tray has to be large in order to provide the required volume of the void space between the filtering particles for deposit of scales and solid contaminants. Any additional height of a hydroprocessing reactor is associated with large extra costs.

SUMMARY OF THE INVENTION

A scale collection and predistribution tray in accordance with the invention is for use upstream from a fine distribution tray in a vessel with downward concurrent flow of vapor and liquid. The tray in accordance with the invention may be classified in group 5 above: Filtering trays with vapor by-pass.

The three main objectives of the collection and predistribution tray in accordance with the invention are:
1. To remove scale and other larger solid contaminants from the process stream upstream from the fine distribution tray and the catalyst bed to prevent fouling and plugging of the fine distribution tray and of the catalyst bed inlet.
2. Predistribution of liquid to the fine distribution tray in order to reduce the liquid level gradients on the fine distribution tray as liquid is flowing in the horizontal direction from one area on the fine distribution tray to another area.
3. To break up (reduce) high fluid flow velocities and provide low fluid flow velocities at the entry to the fine liquid distribution tray.

Trays in accordance with the invention have the above-mentioned benefit of the group 5 filtering trays with vapor by-pass, but while the existing group 5 filtering trays with vapor by-pass do not provide proper predistribution of liquid to the fine distribution tray, the trays in accordance with the present invention do. Also, unlike the existing group 5 filtering trays with by-pass, the trays in accordance with the present invention allow for good utilization of the volume in the curved vessel head for deposit of scales and solid contaminants, and use of such trays therefore does normally not increase the required height and cost of the vessel shell.

One embodiment of the present invention is a polygonal non-perforated tray with a slotted upstanding weir at the rim of the tray. Between the reactor centerline and the slotted weir, an upstanding scale collector wall, such as a screen, a filter, or a wire mesh wall, is located. A liquid trough is thus formed between the scale collector wall and the slotted weir for evening out the liquid level to ensure equal liquid flow rates through each of the slots. The slots of the slotted weir preferably exit the liquid in a direction along the lanes between the distribution units on the fine liquid distribution tray, so that liquid from the slots does not enter the vapor inlets of the distribution units on the fine liquid distribution tray. Vertical liquid guide plates extending outward from the slotted weir toward the reactor wall may be used to direct the liquid from the slots down into the liquid pool on the fine distribution tray. The process stream entering the vessel through the top nozzle, and especially the liquid fraction of this process stream, is preferably brought down to a location near the non-perforated tray through an inlet channel.

The tray according to the invention is designed so all liquid has to pass through the permeable scale collector wall. Scales and particles larger than the opening size in the permeable wall will deposit in the scale collection zone upstream from the wall. The liquid passes through the permeable wall and enters the liquid trough where a stable and horizontal liquid level is established. The liquid from the liquid trough is distributed to the fine distribution tray through the slots in the slotted weir. The vapor from the inlet channel by-passes the scale collection and predistribution tray by flowing upward and over the scale collector wall, then over the slotted weir, and through the open area between the polygonal tray and the reactor wall to the fine distribution tray.

BRIEF DESCRIPTION OF THE DRAWINGS

FIGS. 2A, 2B, 2C, 2D, and 2E are simplified views of one embodiment of the scale collection and predistribution tray according to the present invention located in the upper head of a reactor vessel. FIG. 2A is a vertical side sectional view of the upper reactor head taken along the line A-A of FIG. 2B. FIG. 2B is a horizontal cross sectional view of the reactor head taken along the line B-B of FIG. 2A. FIG. 2C is a side view of a liquid guide taken along the line C-C of FIG. 2B. FIG. 2D is a side view of a liquid guide taken along the line D-D of FIG. 2B. FIG. 2E is an enlarged side view of two slots in the slotted weir shown in FIG. 2A.

FIGS. 5A, 5B, and 5C are side views of different types of apertures in the slotted weir and in the tray plate of a scale collection and predistribution tray in accordance with the present invention.

FIG. 8A is a vertical side sectional view of the upper reactor head. FIG. 8B is an enlarged side view of two slots in the slotted weir.

FIG. 9A is a vertical side sectional view of the upper reactor head. FIG. 9B is an enlarged side view of two slots in the slotted weir.

Figure 1:
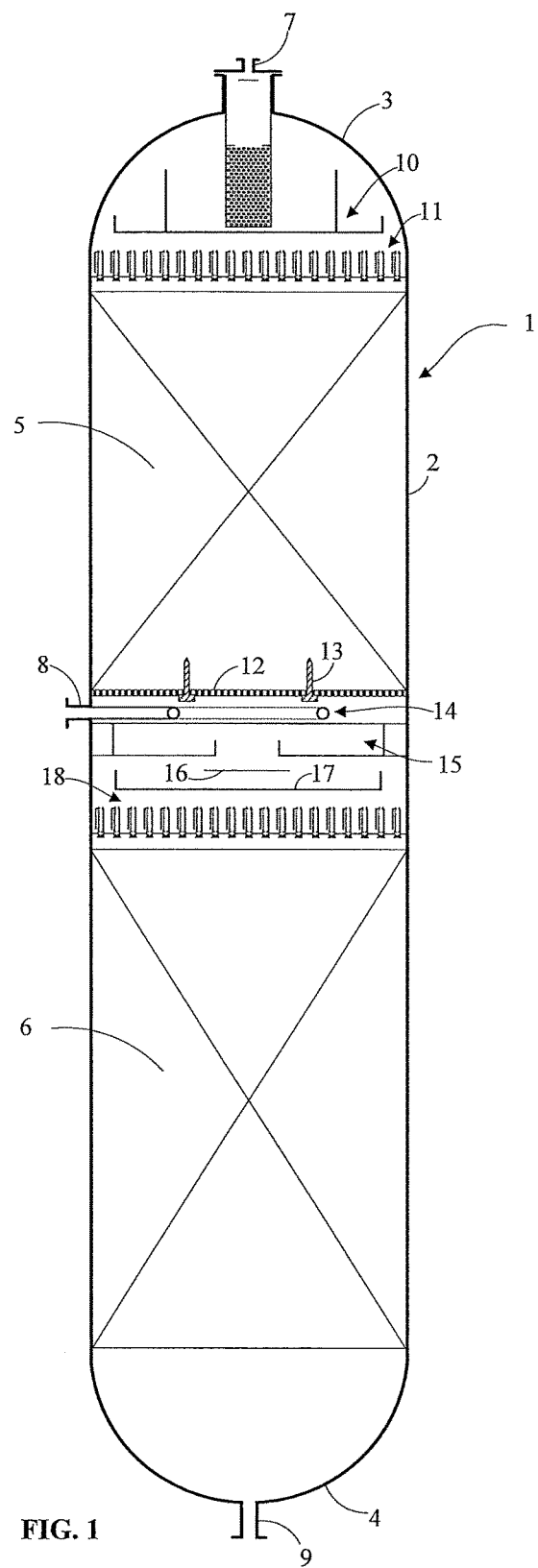
FIG. 1 is a semi-schematic cross-sectional view of a hydroprocessing trickle bed reactor showing a typical layout of the catalyst and internal components in the reactor with two beds of solid catalyst particles, as well as the typical location of the scale collection and predistribution tray in the upper head of the reactor.

Alternative embodiments of the present invention include, but are not limited to, the designs shown in the Figures.

DETAILED DESCRIPTION

The reactions taking place in hydroprocessing trickle bed reactors are exothermic. Heat is therefore released during reaction and causes the temperature to rise when the reactants are converted to products in presence of a hydroprocessing catalyst at elevated temperature and pressure.

In commercial hydroprocessing reactors, the two-phase mixture of reactants flows through a bed of solid catalyst particles. The ideal flow pattern in such a reactor is plug flow, where liquid is flowing downward with the same velocity (based on an empty reactor) at all points of the reactor cross-section. In the ideal plug flow case, the same is true for the vapor phase: The vapor is flowing downwards with identical velocity (based on an empty reactor) at all points of the reactor cross-section.

In commercial reactors, plug flow is never achieved due to non-ideal liquid distribution at the bed inlet, uneven catalyst loading, and/or the presence of deposits/coke in the void space between the catalyst particles.

The feed stream to the trickle bed reactor contains coke scales from upstream furnace tubes and feed/effluent heat exchanger tubes, corrosion products such as iron sulfide from upstream piping and equipment, and other particulate impurities from upstream process systems. These solid contaminants tend to collect on the fine distribution tray, plug the apertures of this tray, and cause uneven distribution of vapor and liquid to the catalyst bed. The solid contaminants also deposit on top of the catalyst bed, with two undesirable consequences:

1. Partial plugging of the inlet to some areas of the bed, resulting in further deterioration of the vapor and liquid distribution in the catalyst bed.
2. Increased pressure drop of the bed.

The uneven distribution of vapor and liquid in the catalyst bed has the following consequences: In some areas of the catalyst bed, the liquid flow velocity is higher than average, and the vapor velocity is lower than average. Due to the high heat capacity of the liquid relative to the vapor, the temperature rise (e.g., in ° C. per meter of flow path) is low in these areas. Similarly in other areas of the catalyst bed, the liquid flow velocity is lower than average, and the vapor velocity is higher than average. Again due to the high heat capacity of the liquid relative to the vapor, the temperature rise (e.g., in ° C. per meter of flow path) is high in these areas.

As a result, even though the reactant mixture has a uniform temperature at the reactor inlet, some areas of the catalyst bed get hotter than others as the fluids are passing through the bed. Further, since the rate of reaction is increasing with increasing temperature, this effect tends to accelerate: The hot areas of the catalyst bed have high rate of reaction, and even more heat is therefore released in these areas than in the cold areas.

Due to the difference in the rates of reaction between the hot areas and cold areas of the catalyst bed, differences in the chemical composition of the fluids are also developed.

The non-uniformity in temperature and chemical composition in a horizontal plane has several negative effects:

All hydroprocessing catalysts deactivate during operation. In order to compensate for the decline in activity of the catalysts, the average bed temperature is increased during the run. At some point in time, at end-of-run, the peak temperature in the catalyst bed reaches its maximum allowable value. At this point, the entire process unit needs to be shut down, and the catalyst must be regenerated or replaced. Now, if there is non-uniformity in temperature in the horizontal plane, the end-of-run will occur at an earlier stage and at a lower average bed temperature. The higher frequency of shut-downs caused by non-uniform temperatures has high cost to the refiner in terms of lost production, catalyst consumption, and additional labor.

Another effect of the non-uniformities is that the degree of chemical conversion is uneven. A fraction of the reactants will be converted to a high extent while the remaining fraction of the reactants is converted to a lower extent. The result is often lower overall product quality.

The increased catalyst bed pressure drop, caused by partial plugging of the bed inlet with solid contaminants, increases the pressure drop of the recycle gas loop and thus the required head of recycle gas compressors and feed pumps. At some point, the design limit for this rotating equipment may be reached, and a premature shut-down of the process unit is required for catalyst skimming, regeneration, or replacement. As mentioned above, a premature shut-down has a high cost to the refiner in terms of lost production, increased catalyst consumption, and additional labor.

Non-uniformities in temperature and chemical composition in the horizontal plane of a catalyst bed and bed pressure drop build-up are unavoidable in commercial hydroprocessing reactors. However, the non-uniformities and the pressure drop build-up can be minimized by installing suitable reactor internals.

For the first catalyst bed, which the feed/reactants enter first, a good scale collection and predistribution tray is required to remove larger solid contaminants from the feed stream, to break up (reduce) the high velocity of the inlet stream to the reactor, and to predistribute the liquid. A good fine distribution tray needs to be provided below the scale collection and predistribution tray to ensure equal distribution of the liquid and vapor over the cross section of the catalyst bed.

For any subsequent catalyst bed(s), a good fine distribution tray is also needed to ensure uniform distribution of the liquid and vapor over the cross section of the reactor. However, the inlet stream to a subsequent catalyst bed is the outlet stream from an upstream catalyst bed where a non-uniform temperature and chemical composition will exist at the bed outlet. Therefore, it is essential to have a mixing device located between the upstream catalyst bed and the fine distribution tray. Otherwise, the non-uniformity in temperature and chemical composition may proceed from one bed to the next and worsen. The purpose of the mixing device is to produce an outlet stream, which is equilibrated regarding temperature and composition.

A quench fluid, which is colder than the fluids inside the reactor, is often injected into the hydroprocessing reactor between two adjacent catalyst beds in order to cool down the hot effluent from one catalyst bed before the fluids enter the next bed. This allows for operation of the reactor closer to isothermal conditions, which has several benefits in terms of increased run length and improved product quality. In this case, a further objective of the mixing device is to mix the cold quench stream with the effluent from one catalyst bed to achieve thermal and compositional equilibrium before the stream enters the next catalyst bed.

Referring now to the drawings, FIG. 1 shows a sketch of a typical hydroprocessing reactor 1 with a wall 2, an upper curved head 3, a lower curved head 4, a first or upper bed 5 of catalyst particles, and a second or lower bed 6 of catalyst particles. FIG. 1 is intended to define a typical location of a scale collection and predistribution tray 10 in accordance with the present invention relative to the catalyst beds and to other reactor internals. The reactants enter the reactor 1 through an inlet nozzle 7. The fluids enter the scale collection and predistribution tray 10, which removes larger solid contaminants and predistributes the liquid to a fine distribution tray 11, such as the distribution tray of U.S. Pat. No. 7,506,861. The fine distribution tray 11 distributes the vapor and liquid evenly over the cross section of the first catalyst bed 5, which rests on a screen or catalyst support grid 12. Large forces are normally acting on the catalyst screen or support grid 12 due to the large weight of the catalyst and due to the forces introduced by the fluid flow through the catalyst bed. Therefore, support beams 13 are normally required to absorb these forces. Below the catalyst support system, a mixing device 15 is located, such as the mixing device of U.S. Pat. No. 7,276,215. Quench fluid may be added through a quench nozzle 8 and a quench distributor 14. Below the mixer, an impingement device 16 is used to break up (reduce) the high velocity of the jet exiting the mixing device 15, and a second predistribution tray 17 may be located below the impingement device 16 for predistribution of the liquid. Beneath the mixer 15, a second fine distribution tray 18 is located, such as the distribution tray of U.S. Pat. No. 7,506,861, which distributes the vapor and liquid evenly over the cross section of the second catalyst bed 6, which normally rests on inert particles or balls (not shown) loaded in the lower reactor head 4. The product from the reactor exits through the outlet nozzle 9.

Although the reactor 1 is shown with two catalyst beds 5, 6, a hydroprocessing reactor may have only a single catalyst bed. Likewise, the number of catalyst beds used in a hydroprocessing reactor may be more than two.

FIGS. 2A, 2B, 2C, 2D, and 2E are simplified views of an upper reactor head with one embodiment of the scale collection and predistribution tray according to the present invention. The reactor vessel has a cylindrical wall 23 and a curved upper head 22. The reactor has a manway 25, for personnel entry into the vessel, and an inlet nozzle 21 for fluid entry into the vessel. A fine distribution tray 33 with a plurality of distribution units 34 arranged on a square pitch is installed in the reactor. Each of the distribution units has a vapor inlet 45. The scale collection and predistribution tray 20 is installed upstream from the fine distribution tray 33 and consists of an octagonal non-perforated tray plate 32 with an upstanding vertical slotted weir 31 provided with a plurality of slots 35. A cylindrical inlet channel 26 with a circular non-perforated bottom plate 29 is used to direct the liquid from the inlet nozzle 21 as close to tray plate 32 as possible. A circular impingement plate 24 is used to break up (reduce) the high velocity of the two-phase stream entering the reactor through the inlet nozzle 21. An annular ring 27 is used to direct liquid to the center of inlet channel 26, in order to get the liquid as far down in the inlet channel 26 as possible. The inlet channel 26 is provided with perforations 28 to allow vapor and liquid to exit the inlet channel 26 in the radial direction.

Between the inlet channel 26 and the slotted weir 31, an optional scale collector wall 30 may be located, forming a scale collection zone upstream this wall. The scale collector wall 30, if present, is a permeable wall, such as a screen or a wire mesh scale collector wall. Between the scale collector wall 30 (if present) and the upper reactor head 22, and between the slotted weir 31 and the upper head 22, free spacing for the by-passing vapor flow must be provided. The tray plate 32 must be elevated at a sufficient height above the distribution units 34 to allow for the inward radial vapor flow between the tray plate 32 and distribution units 34.

If liquid enters the vapor inlet 45 of a distribution unit 34, then the liquid flow through that distribution unit will normally be excessive and result in liquid maldistribution to the upper catalyst bed 5 of FIG. 1. Therefore, the shape of the tray 32 is preferably and advantageously octagonal to allow for a liquid flow direction 36 through the slots 35 along the lanes between distribution units 34 on the fine distribution tray 33. This design significantly reduces the amount of liquid entering the vapor inlets 45 of the distribution units 34, and thus improves the distribution performance of the fine distribution tray 33.

Further reduction of the liquid amount entering the vapor inlets 45 of the distribution units 34 can be achieved by use of optional liquid guides 37 (FIGS. 2C and 2D). A liquid guide 37 consists of two vertical plates 38 and 39 located on each side of a slot 35 on the outer side of the slotted wall 31. The plates 38 and 39 extend down below the vapor inlet 45 of each distribution unit 34, and the plates 38 and 39 therefore guide the liquid exiting the slot 35 down into the liquid pool on the fine distribution tray 33. A bottom plate 36 may be used to break up or reduce the vertical velocity of the liquid falling from each of the slots 35 and to increase the mechanical strength of the design. The liquid guides 37 have been designed to be open for vapor flow in the downward direction between the slotted weir 31 and the upper reactor head 22, and in the radial inward direction between predistribution tray 20 and the fine distribution tray 33.

Figure 2E:
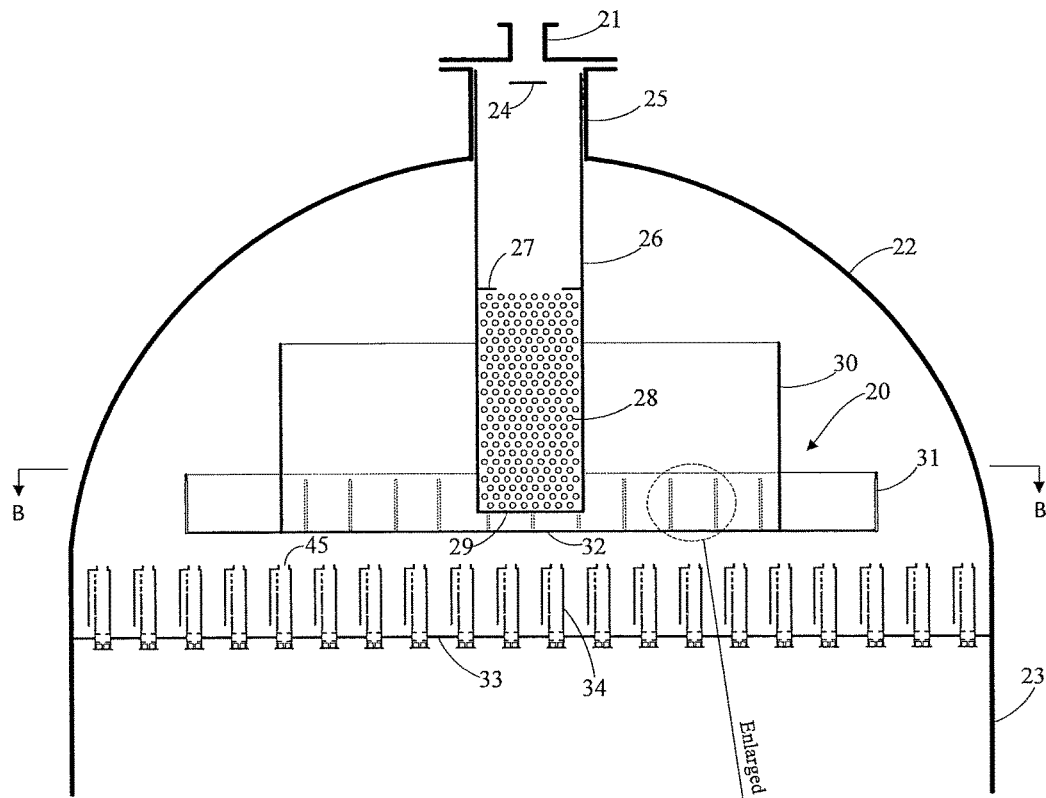
Figure 3:
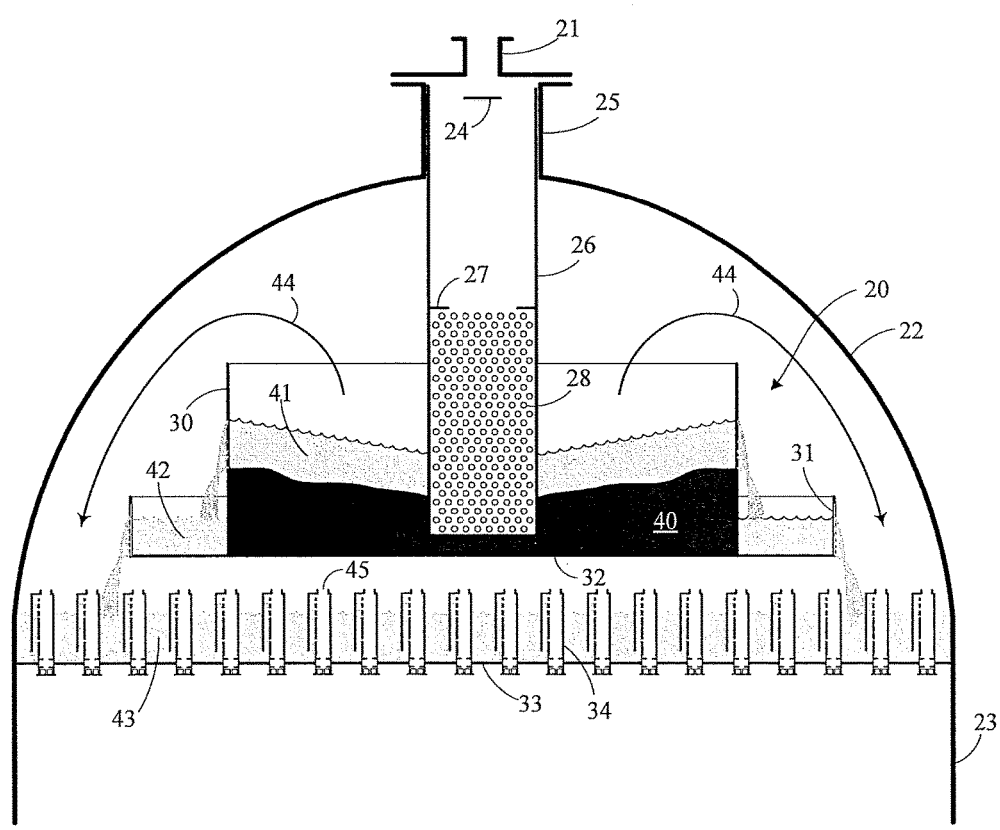
FIG. 3 is a semi-schematic representation of the structure shown in FIG. 2A during operation.

FIG. 3 is a schematic representation of the apparatus of FIG. 2A during operation. The two-phase feed stream enters the reactor through the inlet nozzle 21. The high velocity inlet stream impinges the impingement plate 24, and the vertical velocity component is reduced. The inlet channel 26 directs the two-phase stream downward toward the tray plate 32 of the scale collection and predistribution tray 20. The annular ring 27 directs the liquid to the center of the inlet channel 26, and liquid is routed toward the bottom of the inlet channel 26. The two-phase stream exits the inlet channel 26 through the perforations 28. In the volume between the inlet channel 26 and the scale collector wall 30, the vapor is separated from the liquid 41 and the solid contaminants 40. The vapor flows over the top of scale collector wall 30 and over the top of slotted weir 31 to the fine distribution tray 33 along a path 44.

The liquid 41 and the solid contaminants 40 collect on the tray plate 32 in the scale collection zone upstream from the scale collector wall 30. Scales and the solid contaminants 40 tend to settle by gravity in the scale collection zone and keep the upper parts of the permeable scale collector wall 30 open for liquid flow. The liquid 41 is filtered through the permeable scale collector wall 30 leaving the scale and solid contaminants 40 trapped in the scale collection zone. The liquid from the scale collector wall 30 collects in a liquid trough 42, and a stable and nearly horizontal liquid level is established in the liquid trough 42. The liquid from the liquid trough 42 flows through the slots in the slotted weir 31 to a liquid pool 43 on the fine distribution tray 33. Due to the stable and nearly horizontal liquid level in the liquid trough 42, the liquid flow rates through the slots are close to identical. The liquid streams from the slots enter the liquid pool 43 on the fine distribution tray 33 in between the distribution units 34, so that the liquid does not enter the vapor openings 45.

Figure 2E:
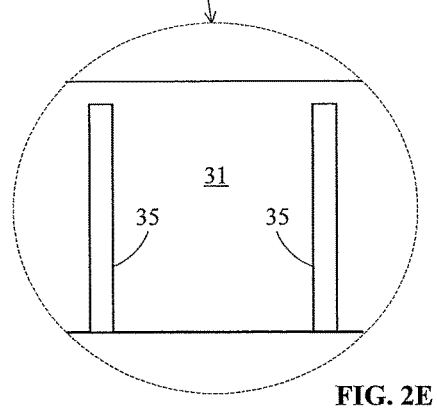
Figure 4:
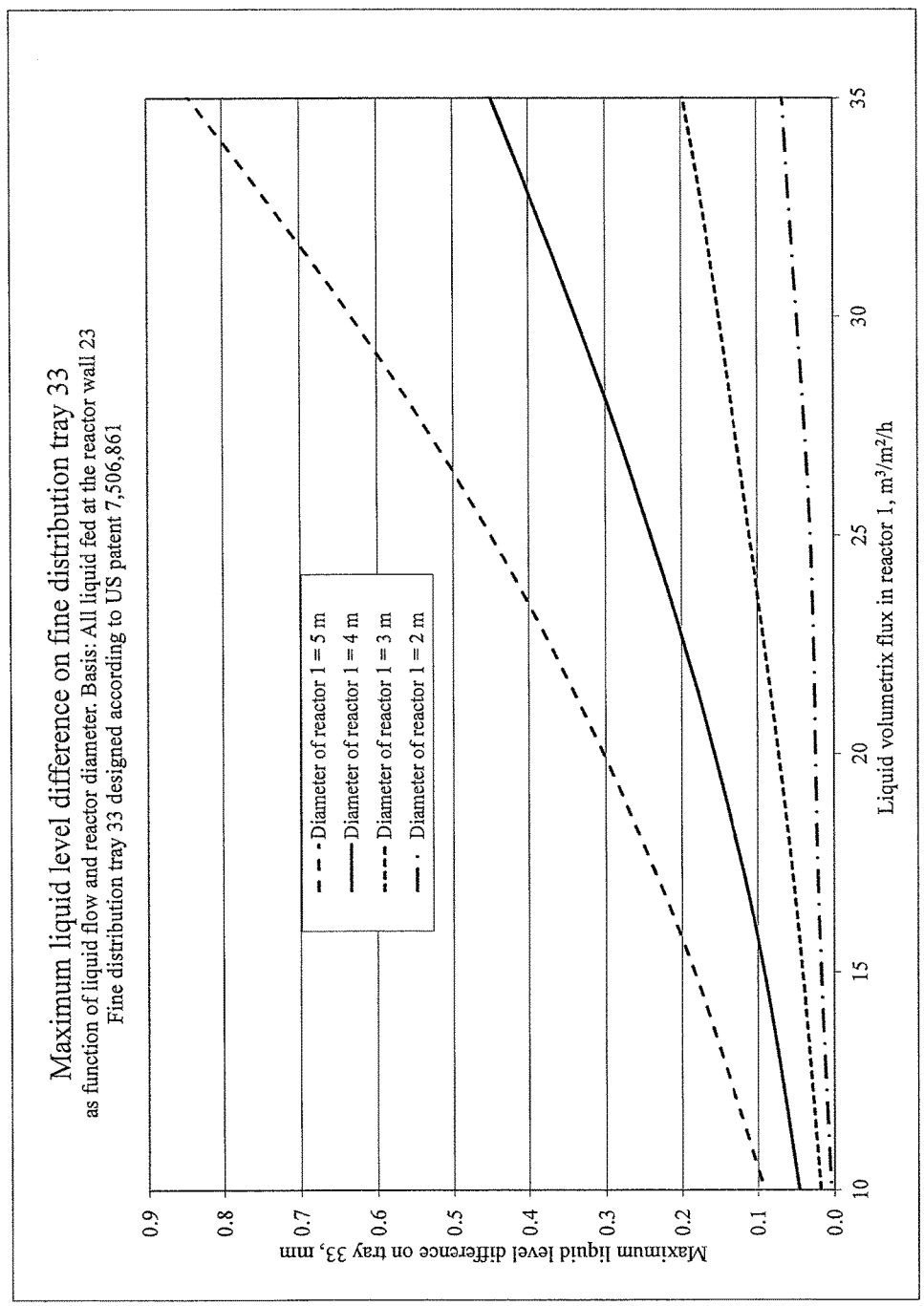
FIG. 4 is a plot of the maximum level difference of the fine distribution tray of U.S. Pat. No. 7,506,861, when all liquid is fed to the area near the reactor wall, as function of reactor diameter and liquid volumetric flux in the reactor.

As illustrated in FIGS. 2 and 3, the liquid is fed to the fine distribution tray 33 near the reactor wall 23, and the liquid consequently has to flow across the fine distribution tray 33 in an inward radial direction to the distribution units 34 located below the tray plate 32. However, as shown in FIG. 4, an inward radial flow direction of liquid on the fine distribution tray 33 from the reactor wall 23 toward the center of the fine distribution tray 33 has shown not to result in any significant liquid level gradients on the fine distribution tray 33. FIG. 4 is a plot of the maximum liquid level difference on a fine distribution tray 33, designed according to U.S. Pat. No. 7,506,861, as function of the diameter of the reactor 1, and as function of the volumetric liquid flux in the reactor 1 when all liquid is evenly distributed in the area adjacent the reactor wall 23. As seen from the graph, the maximum liquid level difference due to liquid flowing across fine distribution tray 33 is less than 1 mm for all normal hydroprocessing applications, which is negligible compared to level differences on the fine distribution tray 33 resulting from fabrication and installation tolerances, and resulting from pressure differences in the vapor space above the liquid pool 43.

The low liquid level difference on the fine distribution tray 33 is a result of good predistribution of liquid from the scale collection and predistribution tray 20 to the fine distribution tray 33. If the liquid from the inlet nozzle 21 is fed to a small area of the fine distribution tray 33, then significant level gradients will occur, and these level gradients will deteriorate the liquid distribution performance of the fine distribution tray 33. Distribution units 34 exposed to a higher liquid level will typically pass more liquid to the first or upper catalyst bed 5 than distribution units 34 exposed to a lower liquid level. Liquid openings or chimneys in the tray plate 32 can be used to distribute liquid to the areas of fine distribution tray 33 located below the scale collection and predistribution tray 20. However, such openings or chimneys are prone to plugging with the solid contaminants 40 which deposit on the tray plate 32, and as seen from FIG. 4, such liquid openings or chimneys are not required since the liquid level difference on the fine distribution tray 33 is already low.

Figure 5C:
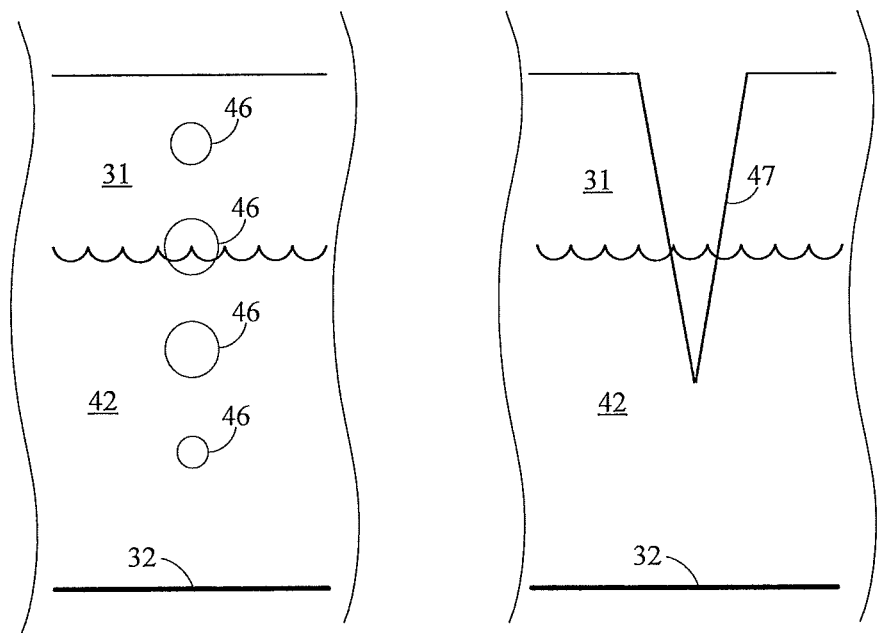
Figure 5C:
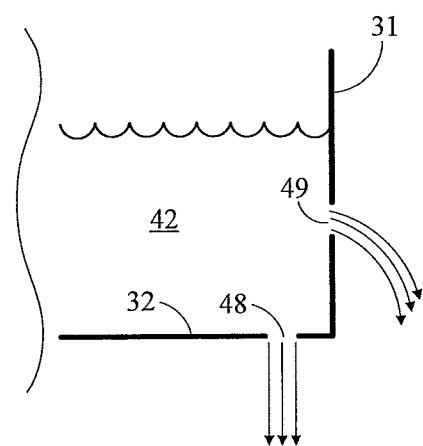

The openings in the weir 31 do not necessarily need to be rectangular slots 35 as shown in FIG. 2E. Other shapes may be used, as illustrated in FIGS. 5A, 5B, and 5C. Circular holes 46 of different sizes and located at different elevations, and V-notches 47, are other examples of possible openings in the weir 31. Openings 48 for liquid flow through the tray plate 32 may also be used alone or in combination with openings 49 in the weir 31.

In FIGS. 2 and 3, the scale collector wall 30 and the slotted weir 31 are shown to be vertical. However, other shapes of the collector wall 30 and the weir 31 may be used, such as angled or curved, to better utilize the volume available in the upper reactor head 22.

Figure 6:
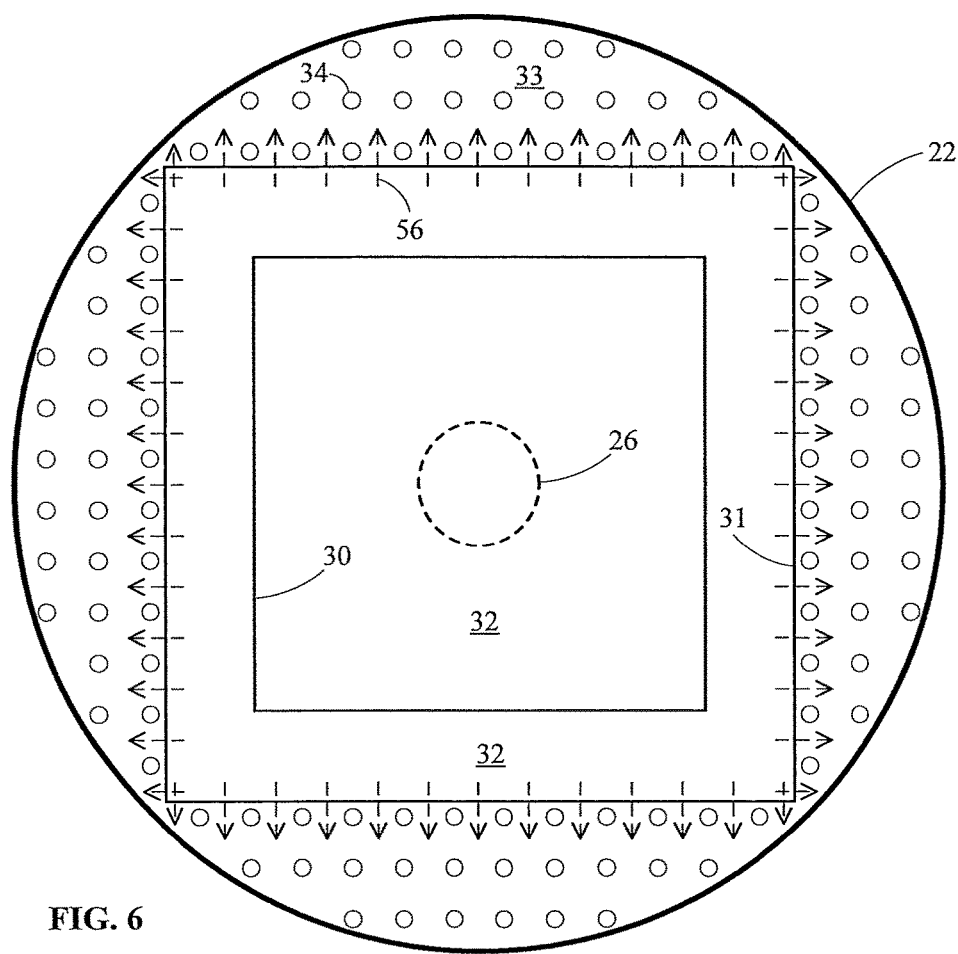
FIG. 6 is a top view of an embodiment of a scale collection and predistribution tray according to the present invention, where the shape of the tray is square.

In FIG. 2B, the tray plate 32 is shown to be octagonal. However for reactors with high vapor flow, a square tray plate 32 will be used, as shown in FIG. 6, in order to increase the vapor flow area between the slotted weir 31 and the upper reactor head 22. The octagonal or square shape of the tray plate 32 is best suited when the distribution units 34 are laid out on a square pitch, since the slotted weir 31 in this case will be perpendicular to the lanes between distribution units 34. This allows for a liquid flow direction 56 through the slots 35 which is along these lanes, so that little or no liquid from slots 35 enters the vapor inlets 45 of the distribution units 34.

Figure 7:
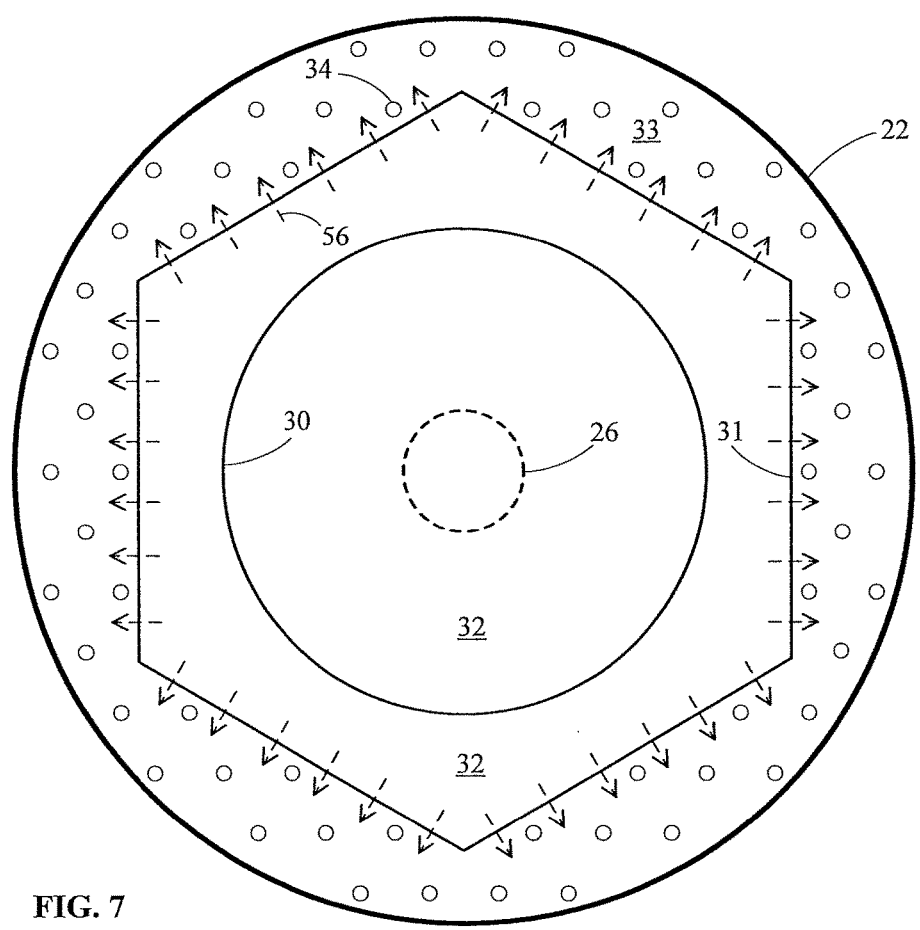
FIG. 7 is a top view of an embodiment of a scale collection and predistribution tray according to the present invention, where the shape of the tray is hexagonal.

The tray plate 32 may have other shapes. If for instance the distribution units 34 are laid out on a triangular pitch, then a hexagonal shape of the tray plate 32 will be optimal, as shown in FIG. 7, in order to ensure that the liquid flow direction 56 through the slots 35 is along the lanes between the distribution units 34 on the fine distribution tray 33. Again this is in order to prevent liquid from the slots 35 from entering the vapor inlets 45 of the distribution units 34.

The scale collector wall 30 may have different shapes as well. These shapes include the polygonal shape, as shown in FIGS. 2B and 6, a circular shape as shown in FIG. 7, or other shapes.

In the embodiment shown on FIGS. 2 and 3, the scale collection zone, where the scales and the solid contaminants 40 are collected, is the zone upstream from a permeable scale collector wall 30. However, the scale collection zone may also be a calm flow zone 50, as illustrated in FIGS. 8 and 9. The calm flow zone 50 is a zone where the flow velocities and flow turbulence are reduced by use of flow restrictions such as baffles, grids, a wire mesh, a packed bed of particles, or packing like random or structured packing. The lower flow velocities in the calm flow zone 50 allow particulate impurities to settle and deposit here. The embodiment in FIG. 8 may be used in reactors where insufficient volume is available in the upper reactor head 22 for a scale collector wall 30, if the vapor flow rates in the reactor are high, or if the reactor has an ellipsoidal upper reactor head 22 instead of a hemispherical reactor head.

Figure 8A:
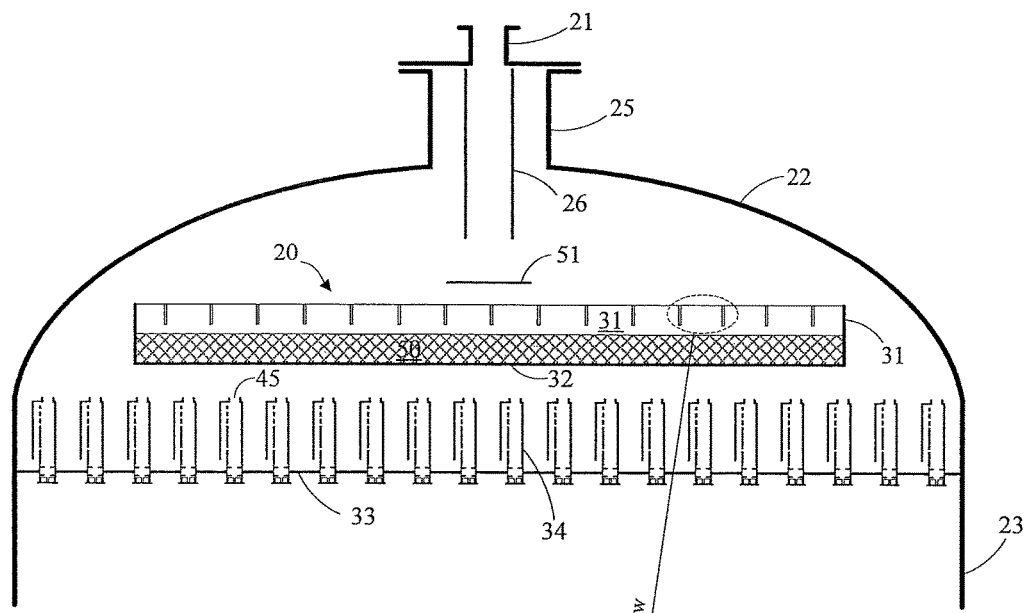
FIGS. 8A and 8B are simplified views of one embodiment of a scale collection and predistribution tray according to the present invention located in the upper head of a reactor vessel.
Figure 8B:
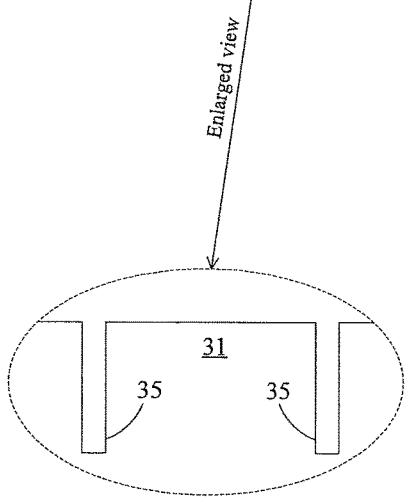

Now referring to FIGS. 8A and 8B, the reactor has a cylindrical wall 23 and an ellipsoidal upper head 22. The upper head 22 is provided with a manway 25 and an inlet nozzle 21. A cylindrical inlet channel 26 directs the inlet stream from the inlet nozzle 21 down to a location near the scale collection and predistribution tray 20. A circular impingement plate 51 is located below the inlet channel 26 to break up or reduce the high velocity of the inlet stream. The scale collection and predistribution tray 20 consists of a square tray plate 32 with a vertically-slotted weir 31. The upper part of the weir 31 is provided with rectangular slots 35 intended for liquid flow. A calm flow zone 50 filled with wire mesh is provided on the tray plate 32, in order to reduce the fluid flow velocity and turbulence near tray 32, to allow particulate impurities to settle and deposit in the wire mesh on the tray plate 32. The tray plate 32 and the slots 35 are located and oriented such that liquid exits the slots 35 in a direction along the lanes between the distribution units 34, to prevent the liquid from entering the vapor inlets 45 of the distribution units 34.

Figure 9A:
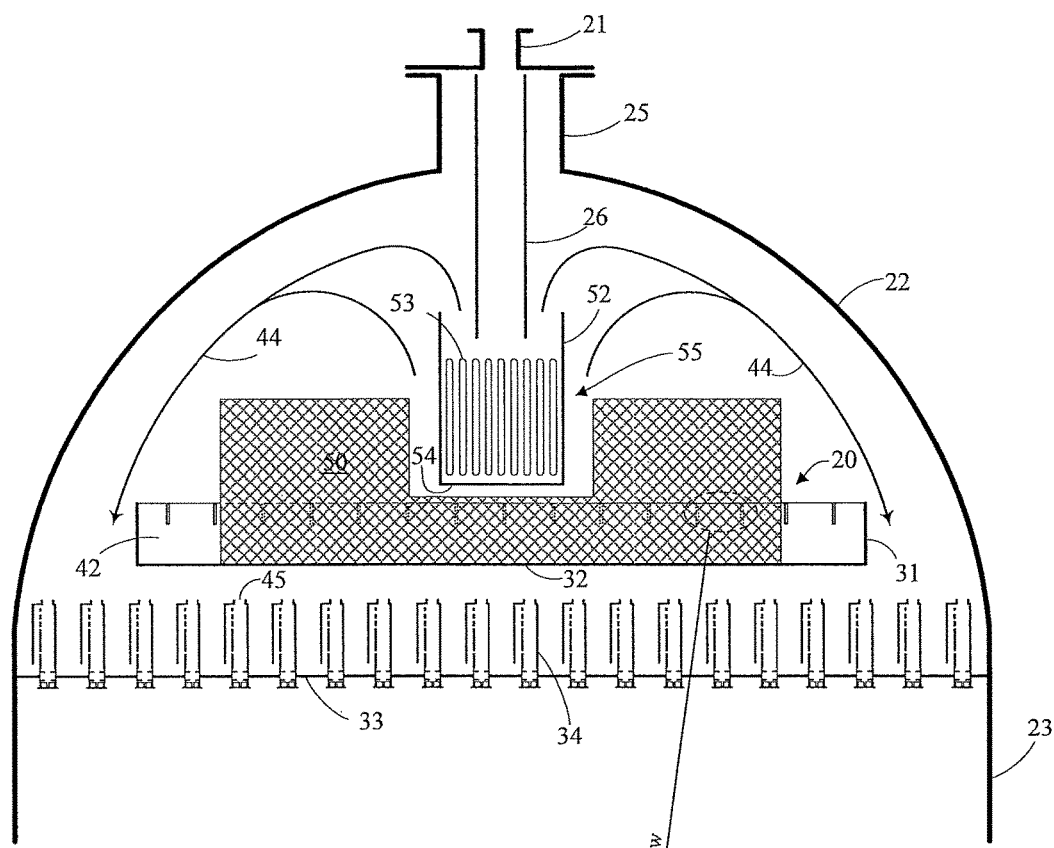
FIGS. 9A and 9B are simplified views of one embodiment of a scale collection and predistribution tray according to the present invention located in the upper head of a reactor vessel.
Figure 9B:
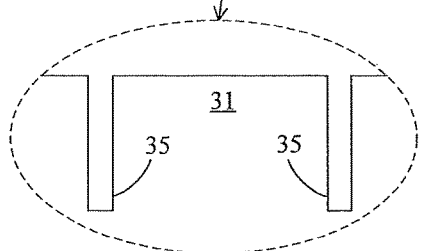

Referring to FIGS. 9A and 9B, the reactor has a cylindrical wall 23 and a hemispherical upper head 22. The head 22 is provided with a manway 25 and an inlet nozzle 21. A cylindrical inlet channel 26 directs the inlet stream from the inlet nozzle 21 down into an inlet basket 55 consisting of cylindrical wall 52 and a non-perforated circular bottom plate 54. The cylindrical wall 52 is perforated by slots 53. The scale collection and predistribution tray 20 consists of a square tray plate 32 and a vertically-slotted weir 31. The upper part of the weir 31 is provided with rectangular slots 35 intended for liquid flow. A calm flow zone 50 consisting of wire mesh is provided on the tray plate 32 in order to reduce the fluid flow velocity and turbulence near the tray plate 32, to allow particulate impurities to settle and deposit in the wire mesh and on the tray plate 32. The purpose of the inlet channel 26 and the basket 55 is to direct the liquid down into the calm flow zone 50, while the majority of the vapor will the take the path 44 from the inlet channel 26 to the fine distribution tray 33. A stable and nearly horizontal liquid level will be established in the liquid trough 42 and ensure equal distribution of liquid to the individual slots 35. The tray plate 32 and the slots 35 are located and oriented such that liquid exits the slots in a direction along the lanes between the distribution units 34, to prevent liquid from entering the vapor inlets 45 of distribution units 34.

As illustrated in FIGS. 2A, 8A and 9A there are several ways of designing the inlet channel 26 with a related impingement device. The important design aspects are to bring the fluids from the inlet nozzle 21 as close to the scale collection and predistribution tray 20 as possible, and to let the fluids exit to the predistribution tray 20 with as low a velocity as possible, in order to allow for separation of vapor, liquid, and solids on the predistribution tray 20, and in order to allow for settling and depositing of the solid contaminants on the tray plate 32. Typically, the vertical velocity component of the fluid stream exiting the inlet channel 26 is reduced by use of a second or lower impingement plate 29 (FIG. 2A), 51 (FIG. 8A), 54 (FIG. 9A), and the horizontal velocity component can be reduced by use of perforations 28 and 53 in the inlet channel wall 26 or the basket 52, where the fluid stream has to flow through. Preferably, liquid and solid contaminants shall be directed as close to the predistribution tray 20 as possible, while vapor shall preferably exit the inlet channel at a higher elevation, to allow the vapor to by-pass the predistribution tray 20 via the path 44. This can be achieved by providing openings for the vapor downstream from an inlet path expansion, such as downstream from an expansion from the center opening of the annular ring 27 in FIG. 2A, or downstream from an expansion from the inlet channel 26 to the basket 52 in FIG. 9A. In these expansions, liquid, due to its larger density, has a tendency to proceed in the vertical downward direction while vapor is more easily deflected and passes through the upper of the openings 28 in FIG. 2A, or through the annular area between the inlet channel 26 and the basket 52 in FIG. 9A.

The tray 32 in FIGS. 2A, 8A, and 9A is typically close to horizontal. The height of the weir 31 in FIGS. 2A, 8A, and 9A is typically between 100 and 400 mm. The height of the slots 35 in FIGS. 2E, 8B, and 9B is typically between 50 and 300 mm. The width of the slots 35 in FIGS. 2E, 8B, and 9B is typically between 5 and 50 mm. The height of scale collector wall 30 in FIG. 2A is typically between 200 and 1200 mm. The height of the calm flow zone 50 in FIGS. 8A and 9A is typically between 100 and 1200 mm. The diameter or width of the inlet channel 26 is typically between 150 and 1000 mm.

The invention claimed is:

1. A method for removal of solid contaminants from a process stream comprising a vapor and a liquid and for predistribution of the liquid to a fine distribution tray in a catalytic reactor vessel with concurrent downflow of the vapor and the liquid, the method comprising the steps of:
    providing a scale collection and predistribution tray inside said catalytic reactor vessel, said scale collection and predistribution tray having a rim;
    passing said liquid through a scale collection zone on said scale collection and predistribution tray for settling and deposit of said solid contaminants;
    passing said liquid from said scale collection zone towards a weir located at the rim of said scale collection and predistribution tray;
    passing said liquid through apertures to said fine distribution tray; and
    passing said vapor from the space above said scale collection and predistribution tray through a flow area between said scale collection zone and a wall of said vessel and through the flow area between said weir and the wall of said vessel to said fine distribution tray.

2. A method according to claim 1, wherein said catalytic reactor has an upper head, and wherein said scale collection and predistribution tray is located inside the upper head of said catalytic reactor to save reactor height.

3. A method according to claim 1, wherein said catalytic reactor defines an upper tangent line, and wherein said scale collection and predistribution tray in whole or in part is located above the upper tangent line of said catalytic reactor to save reactor height.

4. A method according to claim 2 wherein an inlet channel is provided and used to direct the process stream entering the top of said reactor down to said scale collection and predistribution tray.

5. A method according to claim 4 wherein an impingement plate is used to reduce the vertical flow velocity component of said process stream in said inlet channel before entering said scale collection zone.

6. A method according to claim 5 wherein said process stream is directed to flow from said inlet channel through a perforated wall or basket to reduce the horizontal flow velocity component of said process stream before entering said scale collection zone.

7. A method according to claim 1 wherein said process stream is directed through said scale collection zone in a general flow direction being radially outwards toward said weir.

8. A method according to claim 1 wherein a liquid trough is provided between said scale collection zone and said weir and is used to even out liquid level differences in order to obtain an equal liquid height above each of said apertures.

9. A method according to claim 1 wherein said apertures are provided in said weir.

10. A method according to claim 9 wherein said apertures are rectangular slots.

11. A method according to claim 1 wherein said scale collection and predistribution tray is non-perforated.

12. A method according to claim 1 wherein a permeable upstanding wall forms said scale collection zone and wherein said liquid is filtered as it flows through said permeable upstanding wall.

13. A method according to claim 1, wherein said scale collection zone comprises flow restrictions providing a calm flow zone with low flow velocities and low flow turbulence to allow said solid contaminants to settle and deposit in said scale collection zone.

14. A method according to claim 1, wherein said scale collection and predistribution tray has a polygonal shape and wherein said weirs are perpendicular to lanes between distribution units on said fine distribution tray, in order to allow for a liquid exit direction from said apertures along said lanes.

15. A method according to claim 1, wherein liquid guide plates are used to direct the liquid from said apertures and down into a liquid pool on said fine distribution tray.

16. A method according to claim 1 wherein said scale collection and predistribution tray is located in a reactor section between two catalyst beds.

17. A catalytic reactor vessel for concurrent downflow of vapor and liquid in a process stream, the reactor vessel comprising a scale collection device and a predistribution device for removal of solid contaminants and for predistribution of the liquid to a fine distribution tray, said catalytic reactor vessel comprising:
    a scale collection plate located upstream from the fine distribution tray and having a rim;
    a permeable wall extending upwards from the scale collection plate and configured to filter the liquid so as to deposit the solid contaminants in a scale collection zone defined on the scale collection plate upstream from the permeable wall;
    a weir extending upwards from the rim of the scale collection plate and configured for establishing a liquid trough between the permeable wall and the weir, the weir including a plurality of apertures located and configured for passing the liquid from the liquid trough to the fine distribution tray; and
    a passage for the vapor between a wall of the reactor vessel and the weir for passing the vapor from a space in the reactor vessel above the scale collection plate to the fine distribution tray.

18. The catalytic reactor vessel of claim 17, further comprising an inlet channel located and configured to direct the process stream entering the vessel to the scale collection plate.

19. The catalytic reactor vessel of claim 18, further comprising an impingement plate between the inlet channel and the scale collection plate to reduce a vertical flow velocity component of the process stream.

20. The catalytic reactor vessel of claim 18, further comprising a perforated wall between the inlet channel and the scale collection plate through which the process stream is directed to reduce a horizontal flow velocity component of the process stream.

21. The catalytic reactor vessel of claim 17, wherein the scale collection plate is non-perforated.

22. The catalytic reactor vessel of claim 17, wherein the scale collection plate has a polygonal shape, wherein a plurality of distribution units is provided on the fine distribution tray, and wherein the weir is perpendicular to lanes defined between the distribution units on the fine distribution tray, the lanes defining an exit direction for liquid flowing through the apertures in the weir.

23. The catalytic reactor vessel of claim 17, further comprising liquid guide plates located and configured to direct the liquid from the apertures in the weir down into a liquid pool on the fine distribution tray.

24. The catalytic reactor vessel of claim 17, wherein the weir is disposed concentrically around the permeable wall.

25. A catalytic reactor vessel for concurrent downflow of vapor and liquid in a process stream, the reactor vessel comprising a scale collection device and a predistribution device for removal of solid contaminants and for predistribution of the liquid to a fine distribution tray, the catalytic reactor vessel comprising:
- a scale collection plate located upstream from the fine distribution tray and having a rim;
- a scale collection zone on the scale collection plate and comprising a flow-restrictive mesh configured for providing a calm flow zone with low flow velocity and low flow turbulence for the liquid, thereby allowing the solid contaminants to settle and deposit in the scale collection zone;
- a weir extending upwards from the rim of scale collection plate and configured for establishing a liquid trough between the flow-restrictive mesh and the weir, wherein the weir includes a plurality of apertures located and configured for passing the liquid from the liquid trough to the fine distribution tray; and
- a passage for the vapor between a wall of the reactor vessel and the weir for passing the vapor from a space in the reactor vessel above the scale collection plate to the fine distribution tray.

26. The catalytic reactor vessel of claim 25, further comprising an inlet channel located and configured to direct the process stream entering the vessel to the scale collection plate.

27. The catalytic reactor vessel of claim 26, further comprising an impingement plate between the inlet channel and the scale collection plate to reduce a vertical flow velocity component of the process stream.

28. The catalytic reactor vessel of claim 26, further comprising a perforated wall between the inlet channel and the scale collection plate through which the process stream is directed to reduce a horizontal flow velocity component of the process stream.

29. The catalytic reactor vessel of claim 25, wherein the scale collection plate is non-perforated.

30. The catalytic reactor vessel of claim 25, wherein the scale collection plate has a polygonal shape, wherein a plurality of distribution units is provided on the fine distribution tray, and wherein the weir is perpendicular to lanes defined between the distribution units on the fine distribution tray, the lanes defining an exit direction for liquid flowing through the apertures in the weir.

31. The catalytic reactor vessel of claim 25, further comprising liquid guide plates located and configured to direct the liquid from the apertures in the weir down into a liquid pool on the fine distribution tray.

32. The catalytic reactor vessel of claim 25, wherein the weir is disposed concentrically around the flow-restrictive mesh.

* * * * *